US007133124B2

(12) United States Patent
Puttkammer

(10) Patent No.: US 7,133,124 B2
(45) Date of Patent: Nov. 7, 2006

(54) SECURITY ELEMENT STRUCTURE FOR DOCUMENTS, DEVICES FOR CHECKING DOCUMENTS WITH SUCH SECURITY ELEMENTS, METHOD OF THE USE THEREOF

(75) Inventor: Frank Puttkammer, Coswig (DE)

(73) Assignee: WHD Electronische Prueftechnik, Dresden (DE)

( * ) Notice: Subject to any disclaimer, the term of this patent is extended or adjusted under 35 U.S.C. 154(b) by 117 days.

(21) Appl. No.: 10/619,038

(22) Filed: Jul. 13, 2003

(65) Prior Publication Data

US 2004/0012773 A1 Jan. 22, 2004

Related U.S. Application Data

(62) Division of application No. 09/423,275, filed on Jan. 27, 2000.

(51) Int. Cl.
*G06K 9/74* (2006.01)

(52) U.S. Cl. .......................................................... 356/71

(58) Field of Classification Search .................. 356/71; 235/375, 441

See application file for complete search history.

(56) References Cited

U.S. PATENT DOCUMENTS 4,303,307 A * 12/1981 Tureck et al. ................. 283/91
4,560,445 A * 12/1985 Hoover et al. .............. 205/126
5,818,019 A * 10/1998 Irwin et al. ................. 235/375

* cited by examiner

*Primary Examiner*—Gregory J. Toatley, Jr.
*Assistant Examiner*—Roy M. Punnoose
(74) *Attorney, Agent, or Firm*—Neifeld IP Law, PC

(57) ABSTRACT

A structure of a security element for documents provided with a combination of differently reacting or responding security features and functional designs, including conductive, magnetic and diffractive ones, which render it difficult or impossible for counterfeiters to discover the functioning of the security element.

8 Claims, 3 Drawing Sheets

SECURITY ELEMENT STRUCTURE FOR DOCUMENTS, DEVICES FOR CHECKING DOCUMENTS WITH SUCH SECURITY ELEMENTS, METHOD OF THE USE THEREOF

This is a division of U.S. application Ser. No. 09/423,275 filed 27 Jan. 2000.

BACKGROUND OF THE INVENTION

1. Field of the Invention

The invention relates to the structure of security elements for documents, to devices for testing documents incorporating such elements, and to a method of testing the genuineness or authenticity of such documents.

2. The Prior Art

Heretofore, the authenticity of documents incorporating optically diffractive security elements has usually been checked by complex optical test procedures. For instance, testing of documents incorporating an optically diffractive security element or so-called OVD (optically variable device) has been impossible within document handling machines in view of their very high running speeds. German patent specification 27 47 156 discloses a method and a test instrument for testing for counterfeits of holographically secured identity cards. The OVD is reproduced and then visually examined. Such a procedure is unsuited for fast, efficient and automated tests. European patent specification 0,042,946 discloses a device for the production of scanning patterns which are tested by a laser, mirror and line systems as well as by a photo detector. The device is expensive and of low cost efficiency. It would be even more expensive if the material were to be tested without prior sorting. In order to avoid presorting processes it would be necessary to provide a multiple counterfeit test system or to conduct repetitive tests.

European patent specification 0,092,691 A1 discloses an apparatus for detecting security strips in bank notes. The material-specific absorption bands of a plastic safety strip are measured by two channels of light transmitted in the infrared range and at wave lengths of about 5 μm. A counterfeit or quality test utilizing optically diffractive security elements which provide for metallic reflection such as reflex holograms or kinegrams, is neither taught by the European patent specification and nor could it be performed by the disclosed apparatus. From British patent specification 21 60 644 A a reflected light procedure of examining bank notes by means of a line scan camera is known, and from Swiss patent 652,355 it is known to examine cards which are provided with a special layer structure by reflected or transmitted light. In either case the examination depends on comparing the information of an image against originals. In either version, reflections and marks of use pose problems and constitute a great disadvantage. An automatic counterfeit examination of information contained in a hologram is disclosed by German Offenlegungsschrift 38 11 905. The information incorporated in a hologram is examined and analyzed by a transmitter and a receiver which are mounted directly opposite each other. However, the opposite disposition of transmitter and receiver leads to disadvantageous overmodulation and, in some cases, to damage of the receiver because of directly impinging light between successive bank notes. Moreover, the examination of used bank notes is rendered virtually impossible because of accidental reflections caused by creases.

In each case, the known examination processes require exact positioning of the documents and are often unsuited for high-speed processing.

German patent specification 196 04 856 A1 proposes the examination of condition, quality and registration mark of optical safety features provided on documents such as, for instance, bank notes, as metallically reflecting layers such as kinegrams, holograms and the like. A metallically reflecting security feature incorporated in the document is scanned by transmitted light by at least one electronic camera, preferably a CCD line scan camera, and the actual values thus derived are then compared against desired values by known image evaluation processes so that defective bank notes may be marked or used notes may be separated by a sorting device. The apparatus described in German patent specification 196 04 856 A1 is characterized by a known transport device for moving a document in the area of the electronic camera, an infrared radiation source on the side of the document opposite the camera and by the optical axis of the camera enclosing an angle other than 180° relative to the optical axis of the radiation source, and by the transport device being preferably constructed of transport belts separated from each other laterally of the transport direction. This apparatus or method also suffers from the drawback that used bank notes in particular those with creases caused by use and bank notes which have a damaged or surface-soiled kinegram are not recognized as being authentic bank notes. Moreover, while the described method and appurtenant apparatus are automated, they are unsuited nevertheless for use with high-speed bank note machines running at rates of 1,200 pieces per minute.

Security features depending on optical diffraction or OVD on documents such as, for instance, German 100 and 200 Mark bank notes, are at present manually or visually examined for damage, registration accuracy, exact marginal instance, etc. Examination is performed visually during bank note production as well as during possible sorting out of bank notes which are to be withdrawn from circulation. Such procedure is time-consuming and cost-inefficient.

German patent specification DE 195 42 995 A1 discloses, among other things, a method of testing the authenticity of a data carrier by comparing the different available data. The patent offers the following possibilities:

- Comparing the standard image of the hologram against a stored image;
- Comparing the data of the hologram against data in a defined area of the data support and/or those in a storage unit;
- Comparing the data of the hologram against data made available by an input unit;
- Comparing the individual image of the hologram against data of the input unit of the storage unit and/or against data of the defined area.

Also, dyes with special physical properties are known as security elements for rendering documents and bank notes secure. A distinction can be made between dyes which are recognizable either visually or tactily, and those which can only be recognized by special equipment, depending upon the given physical properties of the dye, e.g., electrical conductivity or fluorescence. Interference dyes belong to the group of dyes recognizable without special equipment. These may be found in German Mark notes of the 1996 et seq series (issued in 1997). Changes in the viewing angle result in a change in color. This tilting effect permits rapid and uncomplicated manual individual examinations. Colors with fluorescent or magnetic properties, or of a specific electrical conductivity, can only be detected by appropriate equipment. Current testing devices have a low resolution, however, which necessitates security elements of large dimensions in order to ensure an acceptable recognition.

The examination of printing dyes of different conductivities has been found to be disadvantageous as different conductivities have to be examined successively by different testing devices in the same testing operation or by the same testing device with appropriately configured software in two test operations. Moreover, the measuring accuracy is low when the conductivity of the test field is low. Testing electrically conductive printing dyes which are of different conductivities because of their applied thickness and because of the different electrical conductivities of substrates of the marks, is not possible by any known testing devices because of their low resolution.

The known characteristics, test zones and test structures to be examined, as well as the methods and devices for testing the authenticity of objects, security documents, especially bank notes, suffer from the main disadvantage which is inherent in their being known, i.e. known to an extent which enables a counterfeiter on the basis of his knowledge of the testing methods and devices and their function to draw conclusions in respect of the characteristics to be examined, the testing zones and structures. This compels devising a completely novel task for examining objects, security documents, especially bank notes, the solution to which must be precipitated in a novel system of the use of test characteristics, testing methods and devices, in order to prevent easy detection of information codes and the copying thereof.

OBJECTS OF THE INVENTION

It is an object of the invention to eliminate the disadvantages of the prior art and, in particular, to complete the structure of security elements for documents with further security elements and to propose a novel method of using security elements and devices which significantly complicate or even render it impossible for a counterfeiter to draw conclusions about the security elements to be examined on the basis of the functioning of test methods and devices, in order to produce counterfeits so similar to the originals that they are not detected by the test devices.

A further object of the invention resides in proposing security elements and characteristics or OVD's which in combination with electrically conductive printing dyes may be tested quickly, independently of a person, accurately and with little complexity. The appurtenant devices for testing the characteristics are to be used in high-speed document processing machines as well as manual testing devices. Moreover, it is a task of the invention so to structure several of the devices in accordance with the invention that they test a defined number of several security elements present on a document, with the number of security elements to be tested differing between the devices. The posing of this task aims at attaining different testing criteria depending upon budgetary considerations and the security elements to be tested.

SUMMARY OF THE INVENTION

In the accomplishment of these and other objects the invention provides for the elements, features and methods hereinafter set forth.

The structure of security elements for documents to be tested, instead of being directed to a primarily visual inspection, provides for a design directed to testing methods. The design—hereinafter referred to as functional design—is the combination of electrically conductive and insulating structures of identical or different sizes, in identical or different planes relative to each other, with identical or different conductivities, and is fabricated of metallized structures and/or conductive inks or printing dyes. In its variegated structure and differing composition the functional design is given, in all distinguishable security elements, codifying functions and may thus be tested in an encoded way. In accordance with the invention the functional design may be a security element which may be effective by optical diffraction or may consist of electrically conductive dyes or inks. In case it is structured as an optical diffraction security element it may be identical to the optical, i.e. visually discernible, design and even support it in its optical design. It is also possible to sputter the demetallized or non-metallized zones in order to increase their brilliancy.

The use of holograms and other security elements which are effective by optical diffraction to render certificates and other security documents as well as bank notes secure against counterfeiting is becoming ever more popular. Such documents are, for instance, the 1996 series of German mark notes which, in addition to the electrically conductive security strip, are provided with an optical diffraction security element structured as a kinegram.

Electrically conductive printing dyes are also known. These dyes are applied to the most variegated printed images, particularly on bank notes, in structures within a test characteristic, and because of their low resolution they do not admit of differentiation or recognition of the structures by known testing devices. Those documents are thus rendered more secure against counterfeiting. Thus, the bank note numbers and further graphic details may, for instance, consist of such dyes. Inventive structures in test zones or in printed images of an electrically conductive dye, are provided, in addition to more or less full-area printed surfaces, with at least one testable beam, grid, arcuate and/or circular security element of a line width of $\leqq 5$ mm. These security elements also constitute a codification of data which are detected and evaluated by devices in accordance with the invention. In accordance with the invention, electrically conductive dyes of different conductivities and hues are used, which may be applied in different dye thicknesses for yielding different codes as a result of the different conductivities, thus widening the described codes and increasing the testing accuracy. The dyes with their different conductivities—through their different colors and/or different dye thicknesses as described—provide codes and increase the safety against counterfeiting. Moreover, the different codes resulting from the different conductivities of the dyes are combined, as an additional safety standard, with security elements which are effective by optical diffraction. To test the authenticity of documents with optical diffraction security elements, the electrical conductivity of discontinuous metallizing layers or partially metallized layers or zones of metallized layers in different planes is evaluated by capacitive coupling. The signals derived from such evaluation are combined with code signals from evaluating the dyes and are fed as a uniform test signal to evaluating electronics.

The device for examining the described test characteristics in accordance with the invention is provided with a capacitively operating scanner. The scanner consists of a plurality of transmitting electrodes disposed in a linear array and of a receiving electrode aligned in parallel to the linear array. Compared to sensors with large-surface electrodes, the scanner with its smaller electrode surfaces offers the advantage of reduced capacitive coupling between individual electrodes. The scanner is arranged within a document processing machine such that optical or mechanical sensors present in conventional document processing machines will actuate the testing device in accordance with the invention. To reduce errors of detection and measurement, a sensor support is preferably used which receives all of the testing sensors. The spacings between the sensors are minimized. The minimization of the spacings between the sensors is necessary for reducing the change in position of the objects to be tested, e.g. the bank notes, since during the movement of the bank notes through the machine, the position of the bank note changes because of the condition of the bank note, the amount of wear of the machine as well as ambient conditions, in particular temperature and relative humidity. Bank notes pulled improperly into the machine may cause the spacings between bank notes to be changed. Worn transport rollers and bearings may lead to oblique movement of the bank notes so that a bank note which has been pulled in straight will rotate during transport. The undesirable positional change leads to interference with a defined chronological sequence and to improper rejections. The smaller the testing zones the more difficult it is to detect them. Because of small differences in conductivity between the insulating support and, for instance, the electrically conductive dyes, the device in accordance with the invention is provided with a hold-down device. The hold-down device is necessary because the space between the transmitting and receiving antennae is very small so that the probability of a planar test zone of a bank note sweeping across the sensor is small. However, the hold-down device must be such that it generates very small resistance with respect to the bank notes. Preferably, a hold-down device consists of a foil which is divided into uniform segments. Alternatively, brushes are also suitable, provided, however, their resistance relative to the bank notes is low since they must also accept badly creased bank notes. The hold-down device guides a bank note parallel relative to the scanner or preferably presses the document to be tested against the scanner. Moreover, the axles of the transport rollers are connected to ground by means of brush contacts. This additional shielding and the hold-down device ensure repeatable testing conditions for uniform spacing or contact between bank notes, and the functioning of the sensor is substantially improved. The individual transmitting electrodes are sequentially energized by an energizing circuit having a switching frequency in and above the kHz range. Aside from a current source, the main components of the energizing circuit are a multiplexer, an oscillator for providing energy to the transmitting electrodes and an oscillator for energizing the multiplexer.

In the case of electrical conductivity between transmitting and receiving electrodes the energy of any given energized transmitting electrode is capacitively overcoupled. The signal pattern at the receiving electrode is transformed into a corresponding signal image. The signal image depends upon the structure of the electrically conductive layer of the security element. An evaluation circuit at the output of the receiving electrode compares the signal image of the test object against corresponding reference signals. The evaluation circuit essentially consists of a current source, an amplifier, a demodulator, a comparator, a micro processor including storage and filters for suppressing extrinsic and interference signals.

In addition to software for the microprocessor, the storage contains images of reference signals which are compared against the detected signal image, depending upon the characteristics to be tested. Since the scanner extends beyond the entire width of the document, the device in accordance with the invention will detect every electrically conductive characteristic. The comparison against the reference signal images provides a classifying signal for further processing. Hence, a document detected as a forgery could be sorted out by stopping the testing device or by redirecting the path of the bank note. In order to reduce the effect of noise, the sensor is mounted in a compact manner upon a board which also supports the energizing and evaluating circuits.

The entire testing device is provided within a document processing machine so that the need for space may be kept relatively small. The transmitting and receiving electrodes are disposed above and below the documents in document processing machines such that positive scanning is ensured. This may be accomplished, for instance, by belts or within the area of deflection devices so that during its transport the document is pressed against the transmitting and receiving electrodes. In the case of dye prints with small differences in conductivity pressure rollers will be used the axles of which are additionally connected to ground.

As a variation of the electrode arrangement, it would be within the ambit of the invention to mount one elongated transmitting electrode in parallel to a linear array of a plurality of adjacent receiving electrodes. In such an arrangement the signals received will be processed by a multiplexer. The remaining evaluation circuit corresponds to the one already described.

A further embodiment of the transmitting and receiving electrodes is characterized by a plurality of transmitting and receiving electrodes being arranged adjacent each other and/or in series. Energization as well as reception of the signals are being processed in accordance with a multiplexing or demultiplexing process.

For use in manual apparatus, these will similarly be provided with corresponding devices for transporting the document or the scanner, the function of which is not unlike the function of transport devices in copying machines, optical pull-in scanners or fax machines.

As a variant thereof, there is provided a device which defines the position of a capacitively operating scanner of an apparatus in accordance with the invention relative to a document by abutment elements.

For a selective testing of a defined number of security elements of documents, the devices are equipped with a different numbers of adjacent transmitting or receiving electrodes. The greater the resolution achieved thereby the more security elements and codes of a heightened degree of counterfeiting difficulties may be tested. As a result, simple hand-held devices, for instance for every day use, in which the presence of security characteristics, such as a simple security thread, is examined, may be manufactured in a simple, easily operable and cost-efficient manner. Devices of higher resolution make it possible to test additional security elements without being able, however, to recognize all security elements. This is made possible by simple micro-processor software which is sensitized to predetermined security elements and which is not available to the public. Higher resolution with appropriately structured software for the micro-processor makes it possible to test all security elements. Such high level of testing complexity will be applied, for instance, by the manufacturers of the security elements and by users of very high security standards, to yield the best possible test results. In this manner different conductivities may be reliably recognized.

As part of the entire system of use of the described characteristics and devices for testing objects, documents, especially bank notes, it is also possible within the framework of the invention to recognize an image on, and to control the condition of, the bank notes. Image recognition is possible by means of the electrically conductive security elements, either independently or as a code supporting auxiliary means for sorting, as a code for defining value ranges or as a code for defining authenticity. In the case of an independent code no further test element is present and the electrically conductive element, e.g. its position on a bank note, must be unambiguously definable in order to minimize the rate of improper rejections. In case of a code supporting an auxiliary means further characteristics will be present and the code then serves as a reference in case an improper rejection has been recognized. A control of the condition is carried out by the inventive testing device such that the conductivity of the test element permits conclusions regarding the condition of a bank note, since it is well known that a badly worn bank note entails a deterioration of the electrically conductive printing dyes and, hence, a change in the electrical conductivity. Individual degrees of deterioration are classified by software.

Thus, bank notes of a certain degree of wear may definitely be sorted out. The degree of wear becomes apparent, for instance, as a partially damaged OVD, a ripped bank note and a security element damaged thereby or as a badly creased bank note which may have fractured or broken a security element. There are thus many possible combinations of testing the authenticity, image recognition and condition control. Aside from the optical structuring of test zones on an object to be examined, the security structures in accordance with the invention—as has been described supra—are provided with codes which are mathematically related and result—for instance by summation—in a main code which, in turn, and together with a signal or code from the contemporaneously executed authenticity examination of a metallic security thread and/or a contemporaneous examination of an OVD, defines the authenticity, the condition or the type of a given bank note.

DESCRIPTION OF THE SEVERAL DRAWINGS

The novel features which are considered to be characteristic of the invention are set forth with particularity in the appended claims. The invention itself, however, in respect of its structure, construction and lay-out as well as manufacturing techniques, together with other objects and advantages thereof, will be best understood from the following description of preferred embodiments when read in connection with the appended drawings, in which:

DETAILED DESCRIPTION OF PREFERRED EMBODIMENTS

Figure 1:
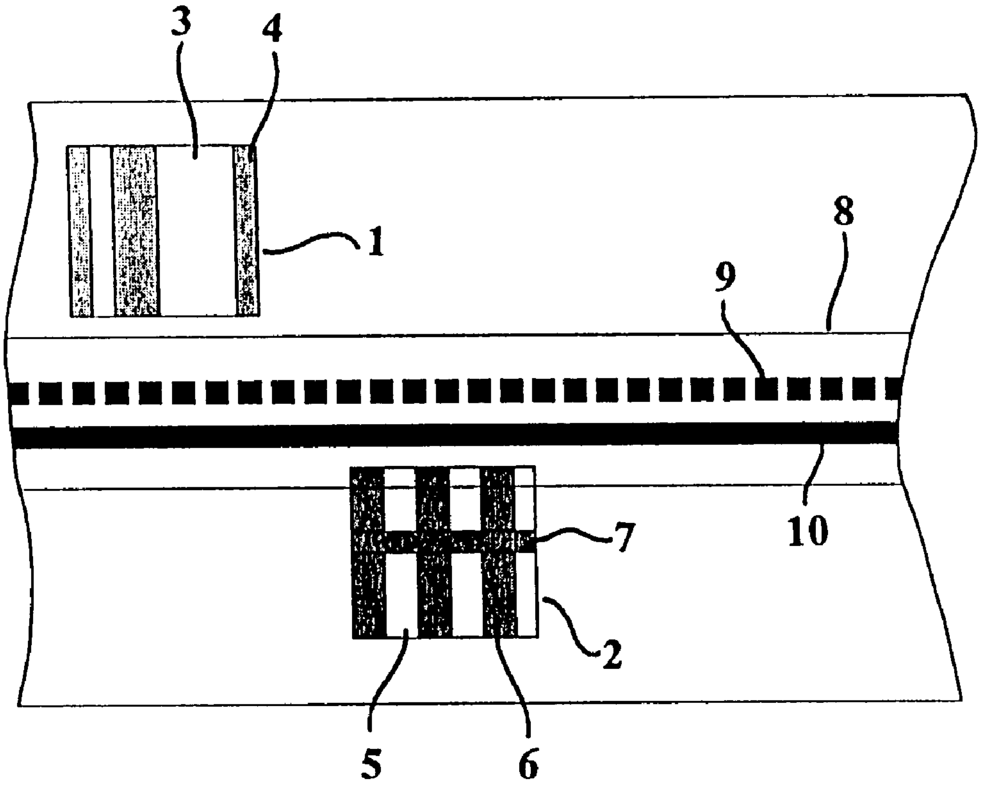
FIG. 1 is a schematic presentation of a document with an electrically conductive color imprint and OVD.

FIG. 1 depicts a document with an electrically conductive color imprint 1 and an OVD 2. The intentional combination of different security elements yields an additional encoding. In this manner the testing accuracy is increased. The figure schematically depicts the structure of an electrically conductive color print 1 provided with parallel alternating conductive striped zones 3 and insulating striped zones 4. The striped zones 3, 4 in a top elevational view appear as stripes extending parallel to the direction of movement of the document. The OVD 2 consists of a metal layer 5, striped demetallized zones 6 extending parallel to the movement of the document as well as of demetallized zones 7 extending normal to the movement of the document. Furthermore, FIG. 1 schematically depicts the scanner 8 with a plurality of transmitting electrodes 9 and one receiving electrode 10.

Figure 2:
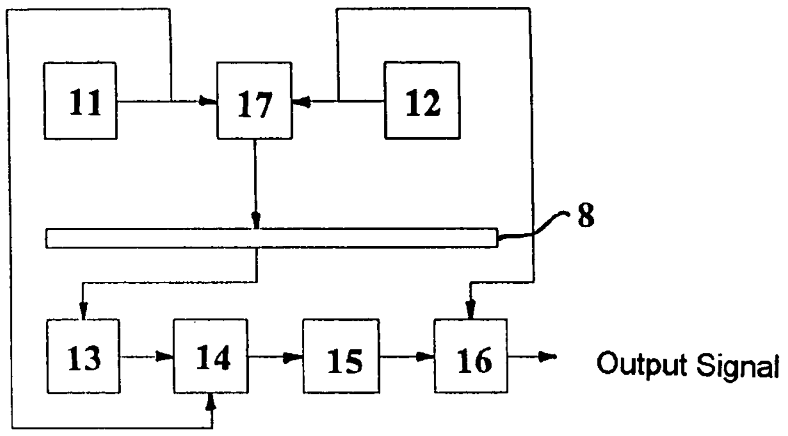
FIG. 2 is a block diagram of a test device.

FIG. 2 is a block circuit diagram of the device in accordance with the invention, consisting of an energizing circuit, a capacitively operating scanner 8 and an evaluation circuit. In addition to a current source, the energizing circuit in essence contains a demultiplexer 17, an oscillator 11 for providing energy to the transmitting electrodes and an oscillator 12 for energizing the demultiplexer.

The evaluation circuit consists mainly of a current source, an amplifier 13, a demodulator 14, a comparator 15, a micro-processor 16 with a storage as well as filters for suppressing extrinsic and interference signals.

The transmitting and receiving electrodes are cast into a sensor support. They form a scanner 8 which capacitively operates across the entire width of the document. The striped receiving electrode 10 extends normal to the direction in which the documents are pulled into the machine. The transmitting electrodes are arranged parallel to the receiving electrode. The distance between a transmitting electrode and a receiving electrode is determined by document-specific electrically conductive testing elements. As a result of the side-by-side arrangement of several transmitting electrodes several electrically conductive elements may be detected simultaneously along the longitudinal axis of the capacitively operating scanner 8. The resolution which can be attained with this arrangement depends upon the number of transmitting electrodes employed. In the present embodiment the resolution, in the longitudinal as well as transverse directions, is one scannable dot per mm. The minimum distance between adjacent transmitting electrodes is limited by the interfering capacitive coupling among the electrodes. In order to reduce this and to prevent interference between neighboring transmitting electrodes, the transmitting electrodes are energized sequentially by a multiplexer 17. By arranging the transmitting electrodes across the entire intake width of a document, the position of the document has no effect on its examination. Accordingly, there is no need for presorting several documents in a document processing machine.

Figure 3:
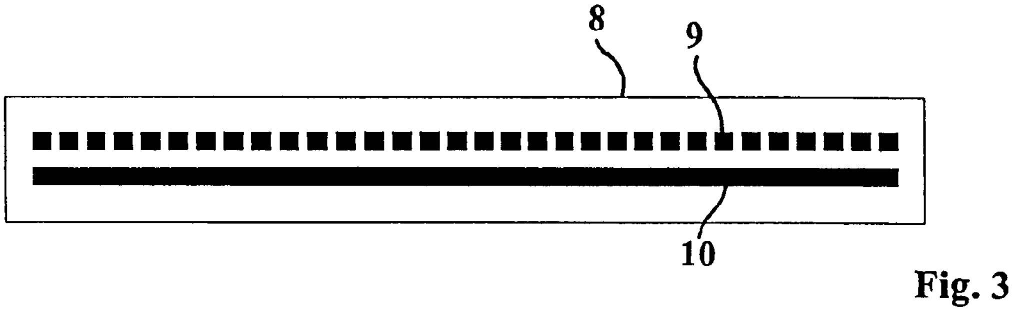
FIGS. 3-5 are schematic presentations of different scanners.

FIG. 3 schematically depicts the scanner 8 with a plurality of transmitting electrodes 9 and one receiving electrode 10. Energization and evaluation are performed in accordance with the circuit block diagram of FIG. 2.

Figure 4:
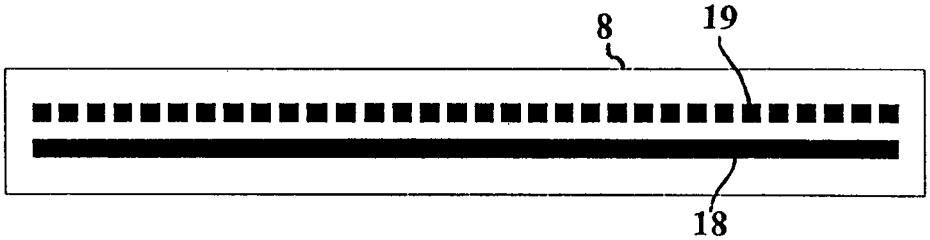

FIG. 4 is a schematic presentation of an embodiment of the capacitively operating scanner with one transmitting electrode 18 and a plurality of receiving electrodes 19. In a manner different from the circuit block diagram of FIG. 2, the transmitting electrode 18 is energized by an oscillator. The signals of the receiving electrodes 19 are processed by a multiplexer. The follow-up evaluation circuit consisting of a current source, an amplifier, a demodulator, a comparator, a micro-processor including storage as well as filters for suppressing extrinsic and interfering signals is similar to the circuit block diagram of FIG. 2.

Figure 5:
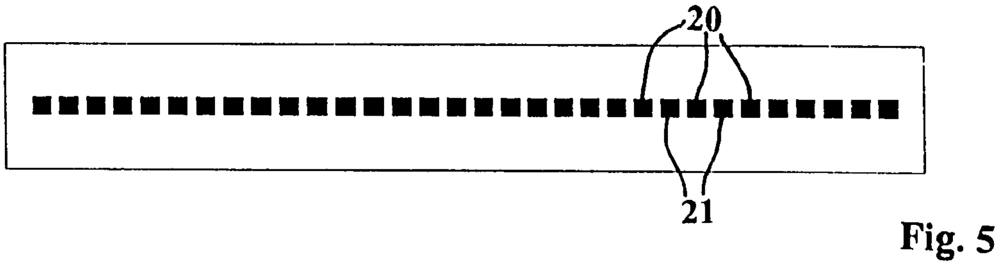

FIG. 5 schematically depicts a further embodiment of the capacitively operating scanner with a plurality of transmitting electrodes 20 and a plurality of receiving electrodes 21. They are arranged alternatingly in a linear array. Accordingly, the energizing signals of the transmitting electrodes 20 and evaluation signals of the receiving electrodes 21 are respectively processed by multiplexing and demultiplexing processes.

Figure 6:
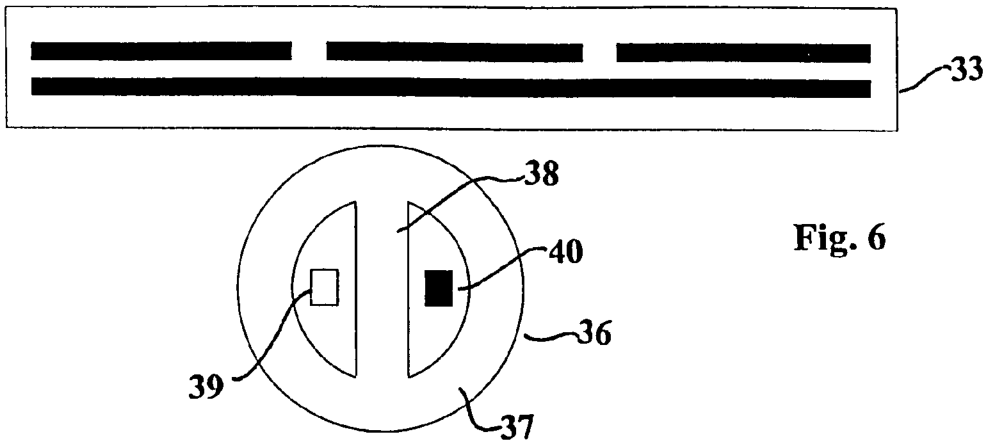
FIGS. 6-8 are schematic presentations of scanners and a structured security element.
Figure 7:
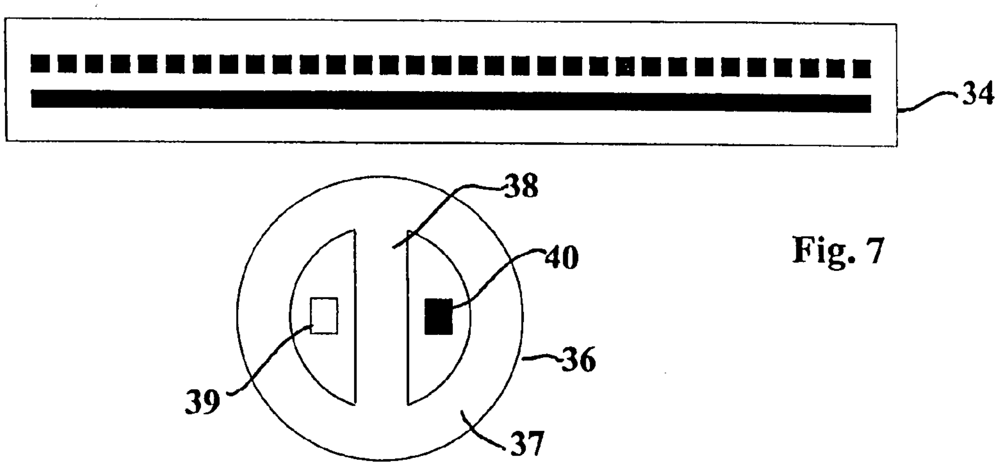
Figure 8:
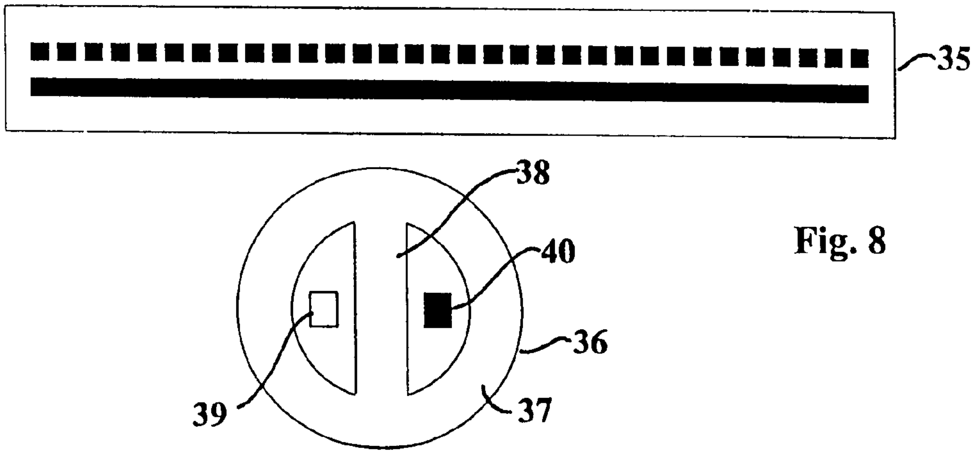

FIGS. 6–8 schematically depict scanners 33, 34, 35 and a structured security element 36. The structure of the security element 36 consists of an annular security element 37, a striped security element 38 and two rectangular security elements 39, 40. The security elements 37, 38, 39 consist of an electrically conductive dye whereas the security element 40 visually resembles the security element 39 but is not electrically conductive. This increases the testing accuracy as it is not possible visually to detect what security elements are present on a document. Simple hand-held apparatus contain a scanner 33 in accordance with FIG. 6. Its resolution is so low that only the striped security element 38 can be detected. Such hand-held apparatus may be used in everyday applications as they are simple, easily handled and cost-efficiently produced.

Higher resolution apparatus as shown in FIG. 7 contain a scanner 34 which, in addition to testing a striped security element 38, permits testing of additional security elements, such as the annular security elements 37 shown. The rectangular security elements 39, 40 are not tested. This is accomplished by simple micro-processor software which is only sensitized to certain security elements. The storage contains no reference signal images of the rectangular security elements 39, 40.

FIG. 8 depicts a higher resolution with correspondingly structured software for the micro-processor. This allows for the testing of all security elements including the rectangular security elements 39, 40.

To accomplish the object of the invention, viz.: to provide a novel system for using testing elements, testing methods and devices, in order to counteract familiarity with, and rapid dissemination of knowledge relating to, the functioning of test methods and devices, the use of test elements, test zones and structures will hereafter be set forth with corresponding applications of methods and including devices in accordance with the invention.

In the examples to follow, the application of the invention is to be described. For a broad application of the invention it is deemed necessary to form groups of examiners which receive defined restricted knowledge of the test system and which by means of a prescribed testing technique execute tests regarding authenticity, image recognition and condition.

The use of the test system will be explained on the basis of groups A, B and C.

Group A:

As is known, government banks issue publications about active security elements to enable users to perform tests on the basis of directions. Those publications relate to test methods performed without and to test methods performed with auxiliary means. In accordance with the invention, the scanner may be mounted in a hand-held testing device. Electrical conductivity may be tested by these hand-held devices and a special software.

The software is modified such that as a bank note is pulled through, optical scanners activate the scanner and the length of the path of movement is measured. In this connection, the electrical conductivity of the color print must have a defined value. The end of the bank note is detected by optical sensors and the scanning sensor is deactivated. In this manner it is possible to determine the position of the electrically conductive test zone on the test object. The data are compared to, and evaluated on the basis of, stored data by means of a controller.

Group B:

Group B owns machines for processing bank notes. These machines are equipped with special sensors for detecting different elements. At present, such machines are equipped with optical sensors and/or sensors for detecting magnetic properties and/or capacitive sensors for testing the length of the path of movement. With such sensors it is possible to detect the presence of electrically conductive elements greater than 6 mm. They do not permit detection of several electrically conductive test zones over the width of the path of movement. Moreover, it is not possible to detect different electric conductivities within test zones. Structures within the test zones also cannot be detected. However, such tests are made possible by the described scanner sensor, so that group B can execute a more refined test. The machines can perform the test by means of special functional printed images and an inventive test device provided with modified software.

The software for group B is set up so as to activate the scanner sensor by optical sensors and thereafter to read the annular security element 37 and the striped security element 38. The value of the conductivity is predetermined. Deviations in excess of or less than 30% are rejected. The scanner sensor is deactivated and evaluated by optical sensors.

Group C:

The software is set up such that all test elements will be recognized. The scanner sensor is activated by optical sensors. The length and width of the structured security element 36 moving through, the annular security element 37, the striped security element 38, the rectangular security element 39 as well as the non-conductive rectangular security element 40 are recognized. The electrical conductivity is predetermined, and deviations greater or smaller than 30% are rejected.

This combined test, in combination with other physical standards, heightens the security standards.

The description regarding group C set forth above will now be rendered more precise:

Group C is provided with the most sophisticated software version or hardware so that all given structures and dimensions of the test field may be detected.

As an additional code the rectangular test element 39 is executed as a characteristic print of different physical sizes.

One possibility resides in forming the rectangular test element 39 as a high quality fluorescent element. This test element may, therefore, be excited by a light source, and the duration of the reminiscence is measured after extinction of the light source. As the bank note passes by it, an optical sensor activates the test sensors. The test sensor consists of an optical sensor and a scanner sensor for detecting electrically conductive test fields. The optical sensor includes a light source and a receiver. The test object is irradiated for a certain time. Thereafter, the reminescence of the colors of the element is measured at the receiver. This reminiscence constitutes a code. The presence of the optical characteristic results in activation of the capacitive scanner sensor. An individual test is also possible.

Another possibility is to structure the rectangular test element 39 as a fluorescent element of different color emissions. Therefore, irradiation of the characteristic element with light of frequency a leads to emission of hue $a^+$. Use of a light source of frequency b leads to hue $b^+$. An optical sensor activates the test sensors which consist of an optical sensor and the capacitive scanner sensor. The optical sensor consists of two light sources of different frequencies. By using special filters only one receiver will be required.

Another possibility resides in using a light source and two receivers with input filters. The optical sensors activate the capacitive scanner sensor if the optical characteristic is present. Here, too, an individual test is possible.

A third possibility is to structure the rectangular test element 39 as a magnetic color print. As a bank note passes by it, an optical sensor activates the test sensors consisting of a magnetic read head and a capacitive scanner sensor. The magnetic read head can detect the presence of a code. If the magnetic characteristic is present the scanner sensor will be activated.

A fourth possibility is to structure the rectangular test element 39 with an electrical conductivity 50% lower than that of the annular security element 37 or of the striped security element 38. Testing requires a special testing software which is available to this group only. If the conductivity is reduced further a static measurement will be required which necessitates a special single note testing device.

Application of groups B and C in particular renders the entire test system variable, and, for testing Euro notes, its functions may be changeable nationally. For instance, since the security element of a Euro note is the same in all states, the testing methods and testing devices may be nationally modified in accordance with points of significance and altered in chronological sequence.

The application of security elements and testing devices as described above is carried out as follows: An image recognition may take place by means of the codified specific metallization. The image recognition may be used for different purposes, such as, in particular, sorting and determining valuation and authenticity. A further advantage of the test method resides in the ability of controlling the condition of a document. Conclusions regarding the condition of bank note paper may be based upon measurements of the electrical conductivity. Badly worn paper results in a significantly reduced electrical conductivity.

The structure of security elements and a device for testing such elements has been explained in the present invention with reference to concrete embodiments. It is to be mentioned, however, that the present invention is not limited to the particulars of the description of the embodiments as variations and alterations are being claimed within the ambit of the patent claims. The specialized combination of optically diffractive security elements with other electrically conductive characteristics result in further coded. At the same time, further electrically conductive test elements such as, for instance, electrically conductive security may be classified by the testing device in accordance with the invention.

What is claimed is:

1. A security element disposed in a web surface, comprising:

a first surface element, said first surface element including (1) electrically conductive sections and (2) electrically nonconductive sections;

wherein said electrically conductive sections and said electrically non-conductive sections are parallel with one another; and a second surface element, including a sequence of (1) striped metallized zones and (2) striped de-metallized zones;

wherein said striped de-metallized zones alternate in said sequence with said striped metallized zones;

wherein said striped de-metallized zones extend parallel to said striped metallized zones; and wherein said striped metallized zones and said striped de-metallized zones have thickness providing for diffraction of optical wavelengths.

2. The security element of claim 1, wherein at least two of said electrically conductive sections have different electrical conductivities from one another.

3. The security element of claim 1, wherein said first surface element and said second surface element are interdigitated.

4. The security element of claim 1, wherein said electrically conductive sections of said first surface element are made of metal.

5. The security element of claim 1, wherein said electrically conductive sections of said first surface element are made of electrically conductive ink.

6. The security element of claim 5, wherein said electrically non-conductive sections of said first surface element are made of ink visually indistinguishable from said electrically conductive ink.

7. The security element of claim 5, wherein said electrically conductive sections are the same color as said electrically non-conductive sections.

8. The security element of claim 1, wherein at least one of said electrically conductive sections, said electrically non-conductive sections, and said striped metallized zones, and said striped de-metallized zones is magnetically responsive.

* * * * *